United States Patent
Bruckman et al.

(10) Patent No.: US 8,199,637 B2
(45) Date of Patent: Jun. 12, 2012

(54) VPLS REMOTE FAILURE INDICATION

(75) Inventors: Leon Bruckman, Petah Tikva (IL);
David Zelig, Ramat-Gan (IL); Ronen Solomon, Givatayim (IL); Ophir Fuchs, Rishon Lezion (IL); Alex Levit, Rehovot (IL)

(73) Assignee: Orckit Corrigent, Ltd., Tel Aviv (IL)

( * ) Notice: Subject to any disclaimer, the term of this patent is extended or adjusted under 35 U.S.C. 154(b) by 310 days.

(21) Appl. No.: 12/093,824

(22) PCT Filed: Nov. 7, 2006

(86) PCT No.: PCT/IL2006/001283
§ 371 (c)(1),
(2), (4) Date: Jul. 22, 2008

(87) PCT Pub. No.: WO2007/057884
PCT Pub. Date: May 24, 2007

(65) Prior Publication Data
US 2008/0285442 A1   Nov. 20, 2008

Related U.S. Application Data

(60) Provisional application No. 60/737,733, filed on Nov. 16, 2005.

(51) Int. Cl.
*H04L 12/26* (2006.01)
*H04L 1/00* (2006.01)
(52) U.S. Cl. ........................................ 370/225; 370/217
(58) Field of Classification Search ........................ None
See application file for complete search history.

(56) References Cited

U.S. PATENT DOCUMENTS

| | | | | |
|---|---|---|---|---|
| 6,741,553 | B1 * | 5/2004 | Grenier | 370/218 |
| 7,469,097 | B2 | 12/2008 | Yost et al. | |
| 2002/0021671 | A1 * | 2/2002 | Quinlan | 370/242 |
| 2003/0021226 | A1 | 1/2003 | Mor | |
| 2003/0058790 | A1 * | 3/2003 | Nagamine | 370/222 |
| 2003/0074469 | A1 | 4/2003 | Busi et al. | |
| 2003/0128706 | A1 * | 7/2003 | Mark et al. | 370/395.1 |
| 2004/0133619 | A1 * | 7/2004 | Zelig et al. | 709/200 |
| 2004/0179472 | A1 | 9/2004 | Khalilzadeh et al. | |
| 2005/0207348 | A1 * | 9/2005 | Tsurumi et al. | 370/241 |

(Continued)

OTHER PUBLICATIONS

Clause 43 of IEEE Standard 802.3, "Crrier Sense Multiple Access with Collison Detection (CSMA/CD) Access Method and Physical Layer Specifications," 2002 Edition.

(Continued)

*Primary Examiner* — Clemence Han
(74) *Attorney, Agent, or Firm* — Peter A. Nieves; Sheehan, Phinney, Bass + Green, PA

(57) ABSTRACT

A method for handling communication failures in a network, which includes provisioning first and second multipoint-to-multipoint communication services over respective first and second alternative sets of links that connect the endpoints in a network. Each of the sets connects network nodes which provide physical layer resources for the links. The communication service is provided to the endpoints over the first set of links using the first service. Upon detecting a failure in the first set of links, the physical layer resources of the links in the first set are deactivated by the network nodes, in order to lose their connections. Responding the loss of connection, the communication service automatically transfers communication to the second set of links.

25 Claims, 2 Drawing Sheets

U.S. PATENT DOCUMENTS

2006/0109802 A1    5/2006  Zelig et al.
2006/0153200 A1*   7/2006  Filsfils et al. ............ 370/395.31
2006/0215548 A1*   9/2006  Le Faucheur et al. ........ 370/228
2009/0154339 A1*   6/2009  Zi ................................ 370/217

OTHER PUBLICATIONS

GARP VLAN Registration Protocol (GVRP). GVRP is described in the IEEE 802.1Q-2003 standard, 2003 editiono, entitled "IEEE Standards for Local and Metropolitan Area Networks—Virtual Bridged Local Area Networks."

IEEE 802. ID standard, 2004 edition, entitle "IEEE Standard for Local and Metropolitan Area Networks—Media Access Control (MAC) Bridges."

Augustyn and Serbest in "Service Requirements for Layer 2 Provider-Provisioned Virtual Private Networks", Internet Engineering Task Force (IETF) RFC 4665, Sep. 2006.

Lasserre and Kompella in "Virtual Private LAN Services Using LDP," IETF Internet draft draft-ietf-l2vpn-vpls-ldp-09, Jun. 2006.

Kompella and Rekhter in "Virtual Private LAN Service (SPLS) Using BGP for Auto-discovery and Signaling", IETF Internet draft draft-ietf-l2vpn-vpls-bgp-08, Jun. 2006.

Resilient Packet Ring (RPR) protocol, which is defined in IEEE standard 802.17-2004, entitled "Part 17: Resilient Packet Ring (RPR) Access Method & Physical Layer Specifications" Jun. 2004.

Martini et al., in IETF RFC 4446, entitle "Pseudowire Setup and Maintenance Using the Label Distribuion Protocol (LDP)", Apr. 2006, section 5.4.2.

Martini in IETF RFC 4446 entitled "IANA Allocations for Pseudowire Edge to Edge Emulation (PWE3)", Apr. 2006, section 3.5.

VLAN Trunking Protocol (VTP), a protocol developed by—Cisco Systems, Inc. (San Jose, California). This protocol is described, for example, in www.cisco.com/warp/public/473/21.html. (2008).

OSPF Opaque LSA is described by Coltun in "the OSPF Opaque LSA Option", IETF RFC 2370, Jun. 1998.

IEEE 802.1 AD-D6.0 draft standard, entitled "Draft Standard for Local and metropolitan Area Networks—Virtual Bridged Local Area Networks—Amendment 4: Provider Bridges", Aug. 2005.

* cited by examiner

VPLS REMOTE FAILURE INDICATION

CROSS-REFERENCE TO RELATED APPLICATIONS

This application is the U.S. National Phase of International Application No. PCT/IL2006/001283, filed Nov. 7, 2006, which claims the benefit of U.S. Provisional Patent Application 60/737,733, filed Nov. 16, 2005, both of which are incorporated herein by reference in the entirety. The International Application published in English on May 24, 2007 as WO 2007/057884 under PCT Article 21(2).

FIELD OF THE INVENTION

The present invention relates generally to communication networks, and particularly to methods and systems for providing virtual private LAN services (VPLS).

BACKGROUND OF THE INVENTION

Virtual private local area network service (VPLS) is a multipoint-to-multipoint (MP-MP) service, which emulates local area network (LAN) functionality over provider networks. VPLS is described, for example, by Augustyn and Serbest in "Service Requirements for Layer 2 Provider-Provisioned Virtual Private Networks," Internet Engineering Task Force (IETF) RFC 4665, September, 2006; by Lasserre and Kompella in "Virtual Private LAN Services Using LDP," IETF Internet draft draft-ietf-12vpn-vpls-ldp-09, June, 2006; and by Kompella and Rekhter in "Virtual Private LAN Service (VPLS) Using BGP for Auto-discovery and Signaling," IETF Internet draft draft-ietf-12vpn-vpls-bgp-08, June, 2006, which are incorporated herein by reference. These documents, as well as other IETF documents cited herein, are available on-line at www.ietf.org.

VPLS is sometimes deployed over ring networks. An exemplary ring architecture is the Resilient Packet Ring (RPR) protocol, which is defined in IEEE standard 802.17-2004, entitled "Part 17: Resilient Packet Ring (RPR) Access Method & Physical Layer Specifications," June, 2004, which is incorporated herein by reference. The 802.17 standard is available at www.standards.ieee.org/getieee802/802.17.html.

The use of VPLS over ring networks is described, for example, in U.S. Patent Application Publication 2006/0109802, whose disclosure is incorporated herein by reference. This publication describes a method for communication via a ring network that includes a plurality of nodes. The method includes receiving at a first node in the ring network a data packet transmitted over a virtual private LAN service (VPLS), the data packet including an identification of the VPLS. The first node reads the identification from the data packet. Responsively to reading the identification, the first node forwards the data packet to at least one second node in the ring network that is associated with the VPLS.

Some point-to-point services provide signaling mechanisms for reporting status to remote peers. Status signaling mechanisms used in pseudowire (PW) services are described, for example, by Martini et al., in IETF RFC 4447, entitled "Pseudowire Setup and Maintenance Using the Label Distribution Protocol (LDP)," April, 2006, section 5.4.2, and by Martini in IETF RFC 4446 entitled "IANA Allocations for Pseudowire Edge to Edge Emulation (PWE3)," April, 2006, section 3.5, both of which are incorporated herein by reference.

SUMMARY OF THE INVENTION

There is therefore provided, in accordance with an embodiment of the present invention, a method for communication, including:

provisioning different first and second instances of a multipoint-to-multipoint (MP-MP) communication service over respective first and second alternative sets of links that connect a plurality of endpoints in a network, each of the sets traversing network nodes, which provide physical layer resources for operating the links;

providing the communication service to the endpoints over the first set of links using the first instance;

upon detecting a failure in the first set of links, deactivating the physical layer resources of one or more of the links in the first set by at least one of the network nodes, in order to cause a loss of connectivity in the first set of links; and responsively to sensing the loss of connectivity, resuming the communication service over the second instance by automatically transferring communication among the endpoints to the second set of links.

In some embodiments, the network includes a ring network. In another embodiment, the communication service includes a virtual private local area network service (VPLS), and the first and second instances include first and second VPLS instances. In yet another embodiment, the communication service includes a bridging service.

Detecting the failure and deactivating the physical layer resources may include sending a message indicating the failure from a network node detecting the failure to other network nodes, and deactivating the physical layer resources by another network node, which provides the physical layer resources to the one or more of the links in the first set, responsively to accepting the message. In an embodiment, sending the message includes advertising the failure using an Opaque Link State Advertisement (LSA) message of an Open Shortest Path First (OSPF) protocol.

In some embodiments, the one or more of the links in the first set include optical links, and deactivating the physical layer resources includes disabling respective laser sources of the optical links. Additionally or alternatively, the one or more of the links in the first set include wire links, and deactivating the physical layer resources includes disabling respective carrier signals of the wire links. Further additionally or alternatively, the one or more of the links in the first set use a physical layer auto-negotiation protocol, and deactivating the physical layer resources includes introducing an auto-negotiation error into the auto-negotiation protocol. In another embodiment, the one or more of the links in the first set include a logical link, and deactivating the physical layer resources includes releasing an association of the logical link with the first instance of the communication service.

In yet another embodiment, defining the first set of links includes classifying a subset of the links in the first set as critical links, and detecting the failure includes deactivating the physical resources only when the failure occurs in one of the critical links.

Defining the first and second sets of links may include sharing respective allocations of network resources reserved for communicating over the first and second sets of links.

There is additionally provided, in accordance with an embodiment of the present invention, a node in a communication network that includes multiple endpoints and first and second alternative sets of links that connect the endpoints, the node including:

a link interface, which is operative to provide a physical layer resource for operating a local link of the first set connected to the node; and a processor, which is arranged to provide a communication service to one or more of the endpoints over the local link using a first instance of the service, to send a first message notifying other nodes in the network upon detecting a local failure in the local link, and to deactivate the physical layer resource provided to the local link upon accepting a second message from another node indicating a remote failure in the first set of links, in order to cause a loss of connectivity in the first set of links and thus cause an automatic transfer of communication among the endpoints to the second set of links and a resumption of the communication service using a second instance of the service different from the first instance over the second set of links.

There is further provided, in accordance with an embodiment of the present invention, a communication network serving a plurality of endpoints, the network including:

a plurality of links, including at least first and second alternative sets of links that interconnect the endpoints via the network; and network nodes, which are traversed by the first and second sets of links and are arranged to provide physical layer resources for operating the links, to provide a communication service to the endpoints over the first set of links using a first instance of the service, to deactivate the physical layer resources of one or more of the links in the first set upon detecting a failure in the first set of links so as to cause a loss of connectivity in the first set of links and thus cause an automatic transfer of communication among the endpoints to the second set of links, and to resume the communication service over the second set of links using a second instance of the service different from the first instance.

The present invention will be more fully understood from the following detailed description of the embodiments thereof, taken together with the drawings in which:

DETAILED DESCRIPTION OF EMBODIMENTS

Overview

The embodiments of the present invention that are described hereinbelow provide methods and systems for providing a multipoint-to-multipoint (MP-MP) network communication service to multiple endpoints in a network using two alternative topologies, i.e., two alternative sets of network links. Typically, one set of links is associated with a particular instance of the service and acts as a primary set. The other set, which serves as backup, is associated with a different service instance. For example, when configuring a ring network, an endpoint can be connected to a ring node using two alternative links, one link from each set. In some embodiments, the service comprises a VPLS, and each of the two sets of links is identified with a different VPLS instance.

Initially, the service is provided over the primary set of links and the associated network service instance. When failure that causes loss of connectivity occurs in the primary set of links, traffic is transferred to the backup set. In many cases, however, there is no direct physical connection between the primary and backup external networks. As a result, processes in upper layers are unable to identify this loss of connectivity in a timely manner in order to rapidly transfer the traffic to the backup set. In such cases, the process of identifying the failure and diverting network traffic to the backup topology is often slow, on the order of several minutes.

In many cases, because of the lack of direct physical connection, upper layer protocols can only rely on timeout mechanisms to identify the loss of connectivity. Implementation complexity considerations often dictate the use of relatively long timeout intervals.

Embodiments of the present invention provide improved methods for rapidly initiating the diversion of traffic from the failed primary topology to the backup topology. In these embodiments, when a network node detects a local failure or other loss of connectivity in the primary topology, the node propagates this information to the other nodes. Upon receiving the propagated failure information, each node deactivates the physical layers of the primary set links that are connected to the node. As a result, the endpoints rapidly detect a local loss of connectivity and cause upper-layer protocols to perform a topology change, i.e., a diversion of traffic to the backup set of links.

For example, in layer-3 networks, the loss of connectivity identified by the endpoints initiates a routing protocol database synchronization process among the network nodes. As a result of the synchronization process, routing tables used by the nodes for packet forwarding begin to use the newly available links.

The resulting traffic diversion process is significantly faster, in comparison to known methods, and is typically completed within a few seconds.

System Description

Figure 1:
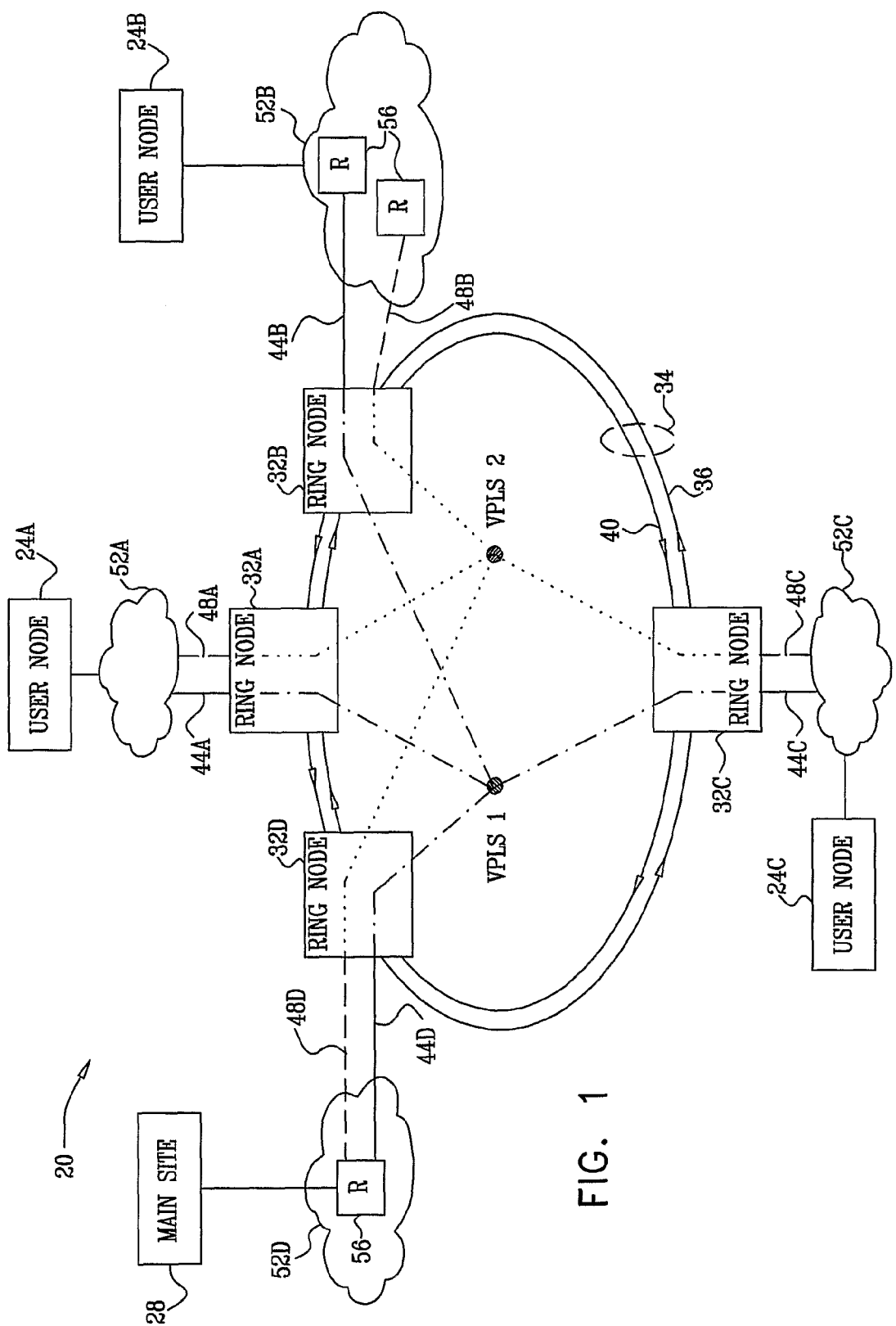
FIG. 1 is a block diagram that schematically illustrates a ring-based communication network, in accordance with an embodiment of the present invention.

FIG. 1 is a block diagram that schematically illustrates a ring-based communication network 20, in accordance with an embodiment of the present invention. Network 20 provides packet communication among multiple endpoints. Some of the endpoints interconnected by network 20 may comprise user nodes, while other nodes may comprise main sites. Main sites may comprise, for example, central databases, media servers or any other nodes having central site functionality, which is of importance to the application or service provided to the user nodes.

In the present example, network 20 comprises three user nodes 24A . . . 24C and a main site 28. In alternative embodiments, network 20 may comprise any desired number of user nodes and main sites, or may comprise only user nodes. Although in the example of FIG. 1 each ring node serves a single endpoint, in alternative embodiments each ring node may serve any desired number of endpoints.

Network 20 comprises multiple ring nodes, which are interconnected by bidirectional ring network. In FIG. 1, network 20 comprises four ring nodes 32A . . . 32D, which are connected by a ring network 34. Ring 34 comprises two unidirectional ringlets 36 and 40, which transfer packets in opposite directions. Ringlet 40 is sometimes referred to as a clockwise (CW) ringlet, and ringlet 36 is sometimes referred to as a counter-clockwise (CCW) ringlet. In some embodiments, ring nodes 32A . . . 32D and ring 34 operate in accordance with the IEEE 802.17 RPR protocol.

Network 20 comprises two alternative topologies that connect the different endpoints. One topology serves as the primary topology, and the other topology serves as backup. Each of the primary and backup topologies is identified with a different service instance. Initially, service is provided to the endpoints over the primary topology and its associated service instance. When failure is detected in the primary topology, traffic is rapidly transferred to the backup service instance and topology, using methods and systems that are described in detail below.

In some embodiments, the service provided to the endpoints comprises a virtual private local area network service (VPLS), and the primary and backup topologies are associated with two different VPLS instances, denoted VPLS1 and VPLS2. The user nodes and main sites are associated with both VPLS instances. Each user node and main site is connected to the corresponding ring node using two different interfaces or links, one link carrying the packets associated with each VPLS instance.

When the primary topology functions properly, the backup links are normally idle. In some cases, however, the backup topology may carry traffic of its own, but has sufficient resources to enable carrying the traffic of the primary topology when necessary.

For example, in FIG. 1, user node 24A is connected through a local routing network to ring node 32A using two separate links 44A and 48A. Links 44A and 48A are associated with VPLS1 and VPLS2, respectively. Similarly, endpoints 24B, 24C and 28 are connected to their ring nodes using VPLS1 over links 44B . . . 44D, and using VPLS2 over links 48B . . . 48D, respectively. Links 44A . . . 44D and 48A . . . 48D may comprise, for example, optical fiber links, copper connections, or any other suitable communication link.

Thus, the endpoints of network 20 are able to communicate via two alternative topologies. The first topology, which uses VPLS1, comprises the ring network and links 44A . . . 44D. The second topology, which uses VPLS2, comprises the ring network and links 48A . . . 48D. The first and second topologies defined above are respectively referred to herein as the "VPLS1 topology" and the "VPLS2 topology" for brevity. Note that some physical elements, such as the elements of the ring network, are common to both topologies. Other elements, such as links 44A . . . 44D and 48A . . . 48D and some of routers 56, are separate.

Typically, each endpoint is connected to the primary and backup links using a local routing network. For example, user node 24A is connected to links 44A and 48A using a local routing network 52A. Each local routing network comprises one or more routers 56. In some embodiments, a single redundant router supports both VPLS1 and VPLS2. Routing network 52D, for example, comprises a single router that connects main site 28 to both VPLS instances.

Alternatively, the local routing network may comprise a pair of simpler and lower cost routers, with each router connected to a single VPLS. For example, user node 24B is connected via a pair of routers, one router connected to each of links 44B and 48B and to VPLS1 and VPLS2, respectively. Such configurations are sometimes preferred because of their lower cost. Further alternatively, any other suitable routing configuration can be used in the local routing networks.

In alternative embodiments, the endpoints in network 20 may be connected using more than two alternative topologies, to provide a higher degree of protection. In particular, 1:N redundancy can be offered by configuring a single backup topology to protect N active primary topologies.

Although the example of FIG. 1 refers to VPLS over a ring topology, the methods and systems described herein are in no way limited to ring networks. Transferring traffic from a primary topology to a backup topology, each associated with a different service instance, can be carried out using the methods described herein in any other network topology and/or any other service type, such as various VPLS topologies described in the above-cited references.

Figure 2:
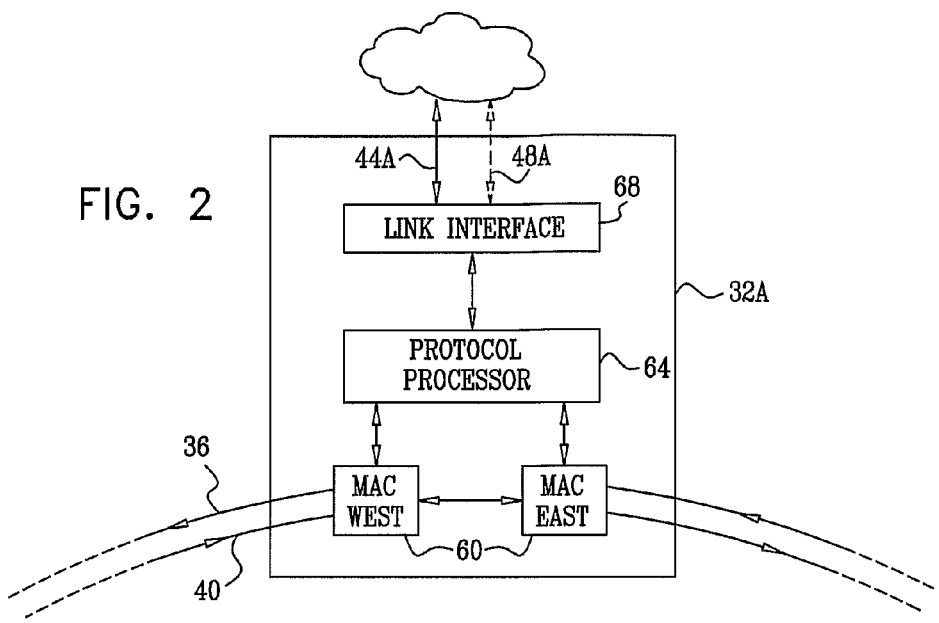
FIG. 2 is a block diagram that schematically illustrates a node in a ring network, in accordance with an embodiment of the present invention.

FIG. 2 is a block diagram that schematically illustrates elements of a ring node, in accordance with an embodiment of the present invention. The figure refers to ring node 32A for clarity. The other ring nodes have similar structure.

Ring node 32A comprises two medium access control (MAC) interfaces 60, denoted "MAC east" and "MAC west." The terms "east" and "west" are used arbitrarily to distinguish between the two opposite directions of packet flow in the ring. MAC interfaces 60 transmit and receive packets over ringlets 36 and 40. Packets that do not enter or leave the ring at node 32A are received by one of the MAC interfaces, transferred directly to the other MAC interface and are relayed to the next ring node along the ring.

Packets that enter or leave the ring at node 32A are processed by a protocol processor 64. The protocol processor forwards packets arriving over the ring to be sent over one of links 44A and 48A, depending on the VPLS with which the packets are associated. In the opposite direction, processor 64 accepts packets that arrive over links 44A and 48A and forwards them to the appropriate MAC interface, which in turn sends them over the ring.

Processor 64 may be implemented using hardware, such as using an application-specific integrated circuit (ASIC), using software, or using a combination of hardware and software elements. Elements and functions of ring node 32A not essential to the understanding of the methods and systems described herein were omitted for clarity. The ring node functionality is described in greater detail in U.S. Patent Application Publication 2006/0109802, cited above.

Each of links 44A and 48A is typically connected to a separate port of the ring node. The ring node comprises a link interface 68, which performs physical-layer interfacing with the links connected to the node. In particular, link interface 68 provides physical layer resources for operating the links. For example, when the links comprise optical links, the link interface comprises one or more laser sources for driving the links. When the links comprise copper links or other wire links, the link interface comprises circuitry for generating a carrier signal over which data is modulated.

As noted above, the exemplary embodiments of FIGS. 1 and 2 refer to ring topologies and ring nodes as an illustrative example. The methods and systems described herein can be used in any other suitable type of network and network node.

Protection Method Description

Network 20 comprises two alternative topologies, each using a different VPLS instance. Initially, communication among the endpoints is carried out over the primary topology (i.e., using VPLS1, over the ring network, links 48A . . . 48D and the appropriate routers 56). When a failure occurs in one of the links of the VPLS1 topology, communication is transferred to the VPLS2 topology.

However, when using known methods, since the VPLS1 and VPLS2 topologies are transparent to the external network, external network processes in upper layers are often unable to identify this loss of connectivity efficiently and in a timely manner, in order to rapidly initiate the necessary migration of traffic to the VPLS2 topology. In such cases, the failure is often only identified by the application layer of the endpoint that is physically connected to the failure point, and not at the other endpoints. When using known methods, the process of identifying the failure and diverting network traffic to the backup topology is often slow, on the order of several minutes.

In order to improve the protection provided by network 20, embodiments of the present invention provide improved methods for initiating the diversion of traffic to the backup topology. In principle, when a network node detects a local failure or other loss of connectivity in one of the links of the primary topology, the node propagates this information to the other nodes of the primary topology. The detecting node propagates the information by distributing a message, which is referred to herein as a remote fault indication (RFI).

Upon receiving an RFI message, each node disables the physical layers of the primary topology links that are locally-connected to the node. Several exemplary mechanisms for disabling the physical layer resources, which are provided by the node to its locally-connected links, are described further below.

As a result, the endpoints rapidly detect a local loss of connectivity and trigger a topology change, i.e., a diversion of the traffic from the failed primary topology to the backup topology. RFI messages are also used for clearing previously-propagated failures, such as when a failed link is restored.

The resulting traffic diversion process is significantly faster, in comparison to known methods, and is typically completed within a few seconds.

In the example of FIG. 1 above, failure information is propagated among the ring nodes, which in turn shut down some of the physical links connected to their ports. In alternative embodiments, however, endpoints can be connected to the ring via other network nodes, such as switches or routers. Shutting down the physical layer of a link toward the endpoint can be performed by any such nodes, and not necessarily by the ring nodes. In these embodiments, failure information is propagated to all network nodes that serve the VPLS in question.

Figure 3:
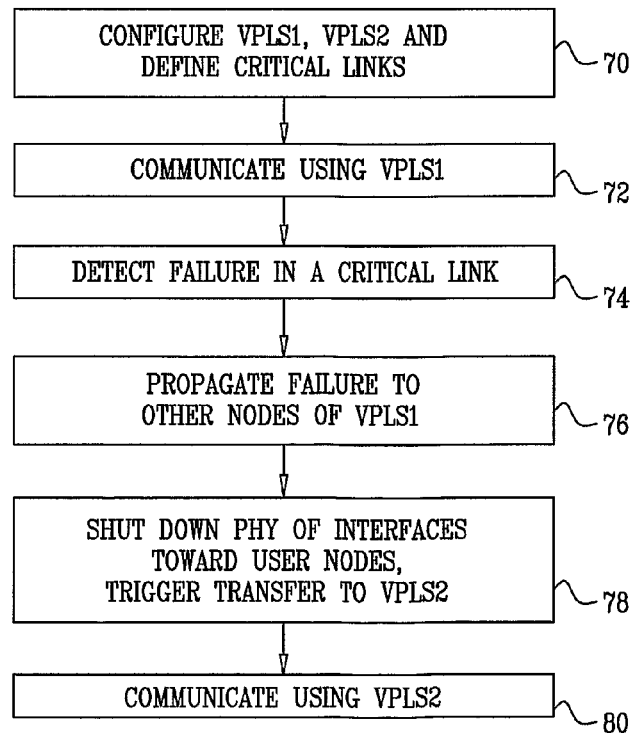
FIG. 3 is a flow chart that schematically illustrates a method for protecting network traffic, in accordance with an embodiment of the present invention.

FIG. 3 is a flow chart that schematically illustrates a method for protecting network traffic, in accordance with an embodiment of the present invention. The method begins with a user, such as a network operator or designer, configuring the different links of the VPLS1 and VPLS2 topologies, at a configuration step 70.

Diverting the entire network traffic from the primary topology to the backup topology is often a complicated and resource-costly process. Therefore, it is sometimes preferable to avoid switching to the backup topology in response to every single link failure, but to initiate the process only when a critical link fails. For this purpose, the user can classify the different links of the VPLS1 and VPLS2 topologies as critical or non-critical. A critical link is defined as a link whose failure triggers a switch-over to the backup topology. Failure of a non-critical link is considered tolerable, and does not initiate such a change.

For example, the links connected to a main site, such as link 44D in FIG. 1 above, can be defined as critical links. Links connected to user nodes, such as links 44A ... 44C in FIG. 1 above, may be defined as non-critical. As another example, a link that connects a node to multiple endpoints may be defined as critical, while a link that serves only a single endpoint may be defined as non-critical. In some cases, all the links of the primary topology can be regarded as critical, i.e., as having equal importance.

Some of the links in network 20 may be locally-protected, such as by aggregating multiple parallel physical links using link aggregation (LAG) methods. For Ethernet™ networks, link aggregation is defined by Clause 43 of IEEE Standard 802.3, "Carrier Sense Multiple Access with Collision Detection (CSMA/CD) Access Method and Physical Layer Specifications," 2002 Edition, which is incorporated herein by reference. Typically, such an aggregated link is considered to fail only when all, or sometimes the majority of its physical links have failed.

Additionally or alternatively to the criteria described above, any other criterion or policy can be used for classifying the links.

In the present example, the VPLS1 topology is assumed to be the primary topology, and the VPLS2 topology serves as backup. As long as the VPLS1 topology functions properly, the different endpoints communicate over the VPLS1 topology, at a normal communication step 72.

When a failure occurs in one of the links of the primary topology, the node connected to the faulty link detects the failure, at a failure detection step 74. If the failed link is classified as critical, the node that identified the failure sends an RFI message to the other nodes of the primary topology, at a failure propagation step 76.

Any suitable protocol can be used for propagating the failure information among the network nodes. For example, the RFI messages may use the Opaque link state advertisement (LSA) option of the open shortest path first (OSPF) protocol. OSPF Opaque LSA is described by Coltun in "The OSPF Opaque LSA Option," IETF RFC 2370, June, 1998, which is incorporated herein by reference.

Alternatively, the failure information may be propagated using any other suitable protocol, such as, for example, the intermediate system to intermediate system (IS-IS) protocol or the border gateway (BGP) protocol.

Typically, the ports connected to links classified as critical are configured to initiate RFI messages. An RFI message using OSPF Opaque usually comprises an identification of the originating node (e.g., an IP address of the node), the VPLS ID, a flag indicating the existence of at least one critical link, and a flag indicating whether the message indicates a failure or a failure-clear notification.

The OSPF Opaque protocol provides measures for controlling the "advertisement scope" of the failure notification, i.e., the network region over which the failure is advertised. Advertisements can be scoped to a particular subnet or area, depending on the specified opaque type. For example, when the advertisements are confined only to ring nodes of a particular RPR network, subnet-level scoping can be used. For more general VPLS topologies, area-level scoping may be preferred. In the latter case, the specific VPLS that contains the failed link can be identified by a global VPN ID field in the advertisement message.

The nodes of the primary topology are updated with the link status of the other links in the network using the OSPF database update mechanism, which holds the information received via Opaque messages from the other nodes. The OSPF protocol comprises a multipoint-to-multipoint database synchronization mechanism. As such, it is only necessary to update the failure in the OSPF database of the detecting node, and the database synchronization mechanism inherently synchronizes the databases of the other nodes.

In some embodiments, network nodes that do not have any physical or virtual interfaces associated with the primary network should still receive the RFI messages and maintain a record of reported failures in the primary topology. If and when a connection termination point (CTP) of the primary topology is configured in such a node, the node can react immediately to the RFI using the stored information.

When the different nodes of the primary topology receive an RFI message, each node shuts down the physical layers of the links that are connected to the node and are associated with the VPLS of the primary topology, at a link shutdown step 78. The detecting node also shuts down any local links associated with the primary topology, other than the failed link, if such links exist. Usually, both critical and non-critical links are shut down. In some embodiments, the failure is propagated to a particular port only if the port is configured to act upon remote fault indications.

For example, in the network configuration of FIG. 1 above, assume link 44D is classified as a critical link, since a failure of this link cuts-off main site 28. When link 44D fails, node 32D detects the failure and sends out an RFI message to the other nodes. Nodes 32A . . . 32C receive the RFI message and locally shut down links 44A . . . 44C, respectively.

Nodes can use different means for shutting down their local links. Since the nodes typically supply the physical layer resources for operating their locally-connected links, shutting down a link may comprise disabling the physical layer resource provided by the node.

For example, when the link comprises an optical link, the node can create a loss-of-signal (LOS) by shutting down the laser source of the link. Alternatively, when the link comprises a copper or other wired link, the node can shut down the carrier signal of the link.

Some optical links use a safety mechanism called automatic laser shutdown (ALS). The ALS mechanism shuts down the laser when a loss of incoming signal is detected, in order to prevent the laser from causing damage to a user when the fiber is cut. ALS usually includes an automatic retry mechanism, in which the laser is switched on briefly to try and resume communication. Shutting down the laser of an optical link that uses ALS may lead to a deadlock situation. Therefore, when using the methods described herein in optical links, the ALS feature should be deactivated.

In some cases, an optical or copper link uses a physical layer auto-negotiation protocol. In such cases, the node can artificially introduce an auto-negotiation protocol failure by sending an auto-negotiation fail message, thus disrupting the link. Additionally or alternatively, the node can use any other suitable mechanism for shutting down local links.

In some network configurations, a link that corresponds to a particular service topology comprises a logical link. For example, in a physical link used for virtual LAN (VLAN) trunking, each VLAN may be mapped to a different VPLS instance. In such a configuration, the same physical link is used to transport multiple service instances. Shutting down this physical link may affect service instances that are not related to the remote failure indication, and is therefore undesirable.

Remote failure propagation can be carried out in such cases by locally shutting down the logical link (in the present example the VLAN) in response to the RFI message. The logical link can be deactivated by releasing the VLAN association of its respective port using a VLAN registration protocol. An exemplary protocol is the GARP VLAN Registration Protocol (GVRP). GVRP is described in the IEEE 802.1Q-2003 standard, 2003 edition, entitled "IEEE Standards for Local and Metropolitan Area Networks—Virtual Bridged Local Area Networks," which is incorporated herein by reference. Another VLAN registration protocol, which can be used for this purpose, is the VLAN Trunking Protocol (VTP), a protocol developed by Cisco Systems, Inc. (San Jose, Calif.). This protocol is described, for example, in www.cisco.com/warp/public/473/21.html.

Additionally, when a logical link associated with a certain VPLS instance fails (e.g., when the node adjacent to the logical link releases the VLAN associated with this VPLS instance), RFI messages are sent over the affected VPLS instance. When the links are classified as critical and non-critical links, the RFI will be sent only is the failed logical link is defined as a critical link.

As a result of the link shutdown, whether physical or logical, the routing network and/or the endpoints themselves (if they are connected directly to the links) immediately recognize a loss of connectivity over the primary topology.

Upper-layer protocols, such as OSPF or the Internet Group Management Protocol (IGMP), are notified of the failure and search for a new available topology that will restore connectivity. Since connectivity is available over the backup topology (the VPLS2 topology), these upper-layer protocols will find this alternative and cause a transfer of communication to the backup topology. The different endpoints now communicate over the VPLS2 topology, and service is resumed, at a backup communication step 80.

In some scenarios, connectivity over VPLS2 may not be available, such as when VPLS2 does not exist or has a failure. In such scenarios, other alternative routes (sometimes called backdoor connections) may exist between the affected nodes. Triggering a topology change by shutting down links, as described above, will cause the network to find and use these routes.

In some cases, the detecting node may fail after sending an RFI message. In such a scenario, the failure is typically cleared after a certain time-out, in order to avoid an infinite failure notification when a node is removed from the network.

A node can clear a previously-advertised failure under certain conditions. For example, a node can clear a failure when it receives an RFI message from the detecting node indicating that the failure no longer exists. The detecting node may advertise a clearing of a failure when the failure is fixed, when the failed link is re-classified as non-critical, and/or when the failed link is re-associated with a different VPLS.

Configuring the primary and backup topologies often comprises reserving bandwidth and/or other network resources to the two topologies. For example, when configuring the primary and backup networks over an IEEE 802.17 RPR network, bandwidth is reserved for the two corresponding VPLS instances in the different spans of the ring. Since in most cases traffic actually flows in only one of the two topologies at any given time, it is possible to share bandwidth and other resource allocations between the two topologies.

For example, U.S. patent application Ser. No. 11/305,485, entitled "Resource Sharing among Network Tunnels," filed Dec. 15, 2005, which is assigned to the assignee of the present patent application and is incorporated herein by reference, describes methods for resource sharing in ring networks that can be used for this purpose. Alternatively, any other suitable resource sharing method can be used.

Although the embodiments described herein mainly address protection using multiple topologies and VPLS instances over an RPR network, the principles of the present invention can also be used for other network types and configurations. For example, the methods and systems described herein are not confined to ring networks, but apply to VPLS in general and can be carried out over any VPLS topology.

Moreover, the methods and systems described herein can be used to protect any other multipoint-to-multipoint service. Such service may comprise, for example, bridging services defined in the IEEE 802.1D standard, 2004 edition, entitled "IEEE Standard for Local and Metropolitan Area Networks—Media Access Control (MAC) Bridges," which is incorporated herein by reference, and in the IEEE 802.1Q standard, cited above. As another example, provider bridges may also be protected by the methods and systems described herein. Provider bridges are defined in the IEEE 802.1AD-D6.0 draft standard, entitled "Draft Standard for Local and Metropolitan Area Networks—Virtual Bridged Local Area Networks—Amendment 4: Provider Bridges," August, 2005, which is incorporated herein by reference.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for handling a communication failure in a network, comprising:
provisioning different first and second instances of a multipoint-to-multipoint (MP-MP) communication service over respective first and second alternative sets of links that connect a plurality of endpoints in the network, each of the sets traversing a plurality of network nodes, which provide physical layer resources for operating the links;
providing the communication service to the endpoints over the first set of links using the first instance;
upon detecting a failure in the first set of links by a detecting node of the plurality of network nodes:
propagating failure information by the detecting node to each node of the other nodes of the plurality of network nodes traversed by the first set of links;
for each node of the other nodes of the plurality of network nodes traversed by the first set of links:
receiving the failure information; and
deactivating a physical layer of the first set of links connected thereto, thereby causing a loss of connectivity in the first set of links; and
responsively to sensing the loss of connectivity, resuming the communication service over the second instance by automatically transferring communication among the endpoints to the second set of links.

2. The method according to claim 1, wherein the network comprises a ring network.

3. The method according to claim 1, wherein the communication service comprises a virtual private local area network service (VPLS), and wherein the first and second instances comprise first and second VPLS instances.

4. The method according to claim 1, wherein the communication service comprises a bridging service.

5. The method according to claim 1, wherein said propagating failure information comprises advertising the failure using an Opaque Link State Advertisement (LSA) message of an Open Shortest Path First (OSPF) protocol.

6. The method according to claim 1, wherein the one or more of the links in the first set of links comprise optical links, and wherein said deactivating the physical layer resources comprises disabling respective laser sources of the optical links.

7. The method according to claim 1, wherein the one or more of the links in the first set of links comprise wire links, and wherein said deactivating the physical layer resources comprises disabling respective carrier signals of the wire links.

8. The method according to claim 1, wherein the one or more of the links in the first set of links use a physical layer auto-negotiation protocol, and wherein said deactivating the physical layer resources comprises introducing an auto-negotiation error into the auto-negotiation protocol.

9. The method according to claim 1, wherein the one or more of the links in the first set of links comprise a logical link, and wherein said deactivating the physical layer resources comprises releasing an association of the logical link with the first instance of the communication service.

10. The method according to claim 1, wherein a link of the first set of links is a critical link, and wherein said deactivating the physical layer is performed only when the failure occurs in the critical link.

11. The method according to claim 1, wherein said provisioning different first and second instances of a multipoint-to-multipoint communication service over respective first and second alternative sets of links comprises sharing respective allocations of network resources reserved for communicating over the first and second sets of links.

12. The method of claim 1, wherein a link in the first set of links includes an optical link, and wherein deactivating the physical layer includes disabling a laser source of the optical link.

13. The method of claim 1, wherein a link in the first set of links includes a wire link, and wherein deactivating the physical layer includes disabling a carrier signal of the wire link.

14. The method of claim 1, wherein a link in the first set of links includes a link which uses a physical layer auto-negotiation protocol, and wherein deactivating the physical layer includes introducing an auto-negotiation error into the auto-negotiation protocol.

15. The method of claim 1, wherein a link in the first set of links includes a logical link, and wherein deactivating the physical layer includes releasing an association of the logical link with the first instance of the communication service.

16. A communication network serving a plurality of endpoints, the network comprising:
a plurality of links, comprising at least first and second alternative sets of links that interconnect the endpoints via the network; and
network nodes, which are traversed by the first and second sets of links and are arranged: to provide physical layer resources for operating the links;
to provide a communication service to the endpoints over the first set of links using a first instance of the communication service;
to detect a local failure in the first set of links;
to propagate a first message notifying all other nodes in the network that are traversed by the first set of links upon detecting the local failure; and
to receive a second message from another node indicating a remote failure in the first set of links; and
responsively to receiving the second message indicating the remote failure, to deactivate the physical layer resources of each node to links in the first set of links connected to that node upon receiving the second message, to cause a loss of connectivity in the first set of links and thus cause an automatic transfer of communication among the endpoints to the second set of links, and to resume the communication service over the second set of links using a second instance of the communication service different from the first instance.

17. The network according to claim 16, wherein a first network node is arranged to detect the failure and to send a third message indicating the failure to a second network node, and wherein a third network node, which provides the physical layer resources to links in the first set, is arranged to deactivate the physical layer resources responsively to accepting the third message.

18. The network according to claim 16, wherein the one or more of the links in the first set of links comprise optical links, and wherein the network nodes comprise respective laser sources for driving the optical links and are arranged to deactivate the physical layer resources by disabling the laser sources.

19. The network according to claim 16, wherein the one or more of the links in the first set of links comprise wire links, and wherein the network nodes are arranged to deactivate the physical layer resources by disabling respective carrier signals of the wire links.

20. The network according to claim 16, wherein the one or more of the links in the first set of links use a physical layer auto-negotiation protocol, and wherein the network nodes are arranged to deactivate the physical layer resources by introducing an auto-negotiation error into the auto-negotiation protocol.

21. The network according to claim 16, wherein a subset of the links in the first set of links are classified as critical links, and wherein the network nodes are arranged to deactivate the physical layer resources only when the failure occurs in one of the critical links.

22. The communication network of claim 16, wherein a link in the first set of links includes an optical link, and wherein deactivating the physical layer resources includes disabling a laser source of the optical link.

23. The communication network of claim 16, wherein a link in the first set of links includes a wire link, and wherein deactivating the physical layer resources includes disabling a carrier signal of the wire link.

24. The communication network of claim 16, wherein a link in the first set of links includes a link which uses a physical layer auto-negotiation protocol, and wherein deactivating the physical layer resources includes introducing an auto-negotiation error into the auto-negotiation protocol.

25. The communication network of claim 16, wherein a link in the first set of links includes a logical link, and wherein deactivating the physical layer resources includes releasing an association of the logical link with the first instance of the communication service.

\* \* \* \* \*